(12) United States Patent
Nojima (10) Patent No.: US 10,831,090 B2
(45) Date of Patent: Nov. 10, 2020

(54) WAVELENGTH CONVERSION ELEMENT, ILLUMINATION DEVICE, AND PROJECTOR

(71) Applicant: SEIKO EPSON CORPORATION, Tokyo (JP)

(72) Inventor: Shigeo Nojima, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/774,054

(22) Filed: Jan. 28, 2020

(65) Prior Publication Data

US 2020/0241405 A1  Jul. 30, 2020

(30) Foreign Application Priority Data

Jan. 29, 2019  (JP) ................................. 2019-013262

(51) Int. Cl.
  *G03B 21/14* (2006.01)
  *H04N 9/31* (2006.01)
  *G03B 21/20* (2006.01)

(52) U.S. Cl.
  CPC ....... *G03B 21/204* (2013.01); *G03B 21/2066* (2013.01); *H04N 9/317* (2013.01); *H04N 9/3161* (2013.01)

(58) Field of Classification Search
  CPC .. G03B 21/14; G03B 21/204; G03B 21/2066; H04N 9/31; H04N 9/3161
  See application file for complete search history.

(56) References Cited

U.S. PATENT DOCUMENTS

| 2016/0091712 | A1 | 3/2016 | Egawa et al. |
| 2019/0072243 | A1 | 3/2019 | Egawa |
| 2019/0302587 | A1* | 10/2019 | Shimizu ............... G02B 26/008 |
| 2019/0302591 | A1* | 10/2019 | Nojima .............. G03B 21/2066 |
| 2020/0004118 | A1* | 1/2020 | Hsu ....................... G02B 26/008 |
| 2020/0241406 | A1* | 7/2020 | Nojima ................ H04N 9/3164 |

FOREIGN PATENT DOCUMENTS

| JP | 2014-192127 A | 10/2014 |
| JP | 2016-070947 A | 5/2016 |
| JP | 2017-083581 A | 5/2017 |

* cited by examiner

*Primary Examiner* — William C. Dowling
(74) *Attorney, Agent, or Firm* — Oliff PLC

(57) ABSTRACT

A wavelength conversion element according to the present disclosure includes a base member having a reflecting surface, a wavelength conversion section having a first surface which excitation light in a first wavelength band enters, and a second surface opposed to the base member, and configured to perform a wavelength conversion on the excitation light into fluorescence in a second wavelength band, a holding section configured to hold the wavelength conversion section to the base member, and an air layer disposed in one of a space surrounded by a first recessed part provided to the base member so as to be opposed to the second surface of the wavelength conversion section and the second surface of the wavelength conversion section, and a space surrounded by a second recessed part provided to the wavelength conversion section so as to be opposed to the reflecting surface of the base member and the reflecting surface of the base member, wherein in the first surface, at least a part of a portion opposed to the reflecting surface and the air layer is set as an incident area of the excitation light.

17 Claims, 6 Drawing Sheets

FIG. 11

WAVELENGTH CONVERSION ELEMENT, ILLUMINATION DEVICE, AND PROJECTOR

The present application is based on, and claims priority from JP Application Serial Number 2019-013262, filed Jan. 29, 2019, the disclosure of which is hereby incorporated by reference herein in its entirety.

BACKGROUND

1. Technical Field

The present disclosure relates to a wavelength conversion element, an illumination device, and a projector.

2. Related Art

In recent years, as an illumination device for a projector, there has been proposed an illumination device using a wavelength conversion element such as a rotary phosphor plate. The rotary phosphor plate generates fluorescence in response to irradiation with excitation light on a phosphor layer performed in the state in which a substrate provided with the phosphor layer is rotating, and thus generates illumination light including the fluorescence.

JP-A-2014-192127 (Document 1) discloses a "fluorescence source device" provided with an exciting light source, a wavelength conversion member for converting the wavelength of the excitation light from the exciting light source to emit the fluorescence, and a base for supporting the wavelength conversion member, and having a fluorescence reflecting surface disposed on a surface opposed to a plane of incidence of the excitation light of the wavelength conversion member. Document 1 discloses a configuration in which a fluorescence reflecting mirror and the wavelength conversion member both provided to the base are disposed separately from each other, and an air layer is disposed between the fluorescence reflecting mirror and the wavelength conversion member.

The wavelength conversion element described in Document 1 is a wavelength conversion element in which the fluorescence generated in a wavelength conversion layer is reflected and then extracted to the outside, namely a so-called reflective wavelength conversion element. In the wavelength conversion element of this type, a reflecting surface for reflecting the fluorescence is disposed on an opposite side to the plane of incidence of the excitation light of the wavelength conversion layer. However, there is a problem that a loss occurs when the fluorescence is reflected by the reflecting surface, and thus the luminous efficiency decreases.

SUMMARY

A wavelength conversion element according to an aspect of the present disclosure includes a base member having a reflecting surface, a wavelength conversion section having a first surface which excitation light in a first wavelength band enters and a second surface opposed to the base member, and configured to perform a wavelength conversion on the excitation light into fluorescence in a second wavelength band different from the first wavelength band, a holding section configured to hold the wavelength conversion section to the base member, and an air layer disposed in one of a space surrounded by a first recessed part provided to the base member so as to be opposed to the second surface of the wavelength conversion section and the second surface of the wavelength conversion section, and a space surrounded by a second recessed part provided to the wavelength conversion section so as to be opposed to the reflecting surface of the base member and the reflecting surface of the base member, wherein in the first surface, at least a part of a portion opposed to the reflecting surface and the air layer is set as an incident area of the excitation light.

In the wavelength conversion element according to the aspect of the present disclosure, the wavelength conversion section may further have a third surface crossing one of the first surface and the second surface, the holding section may have an adhesive configured to bond the third surface of the wavelength conversion section and the base member to each other, the base member may have the first recessed part and a third recessed part which is at least partially opposed to the second surface of the wavelength conversion section, and is disposed separately from the first recessed part, a part of the adhesive may be housed in the third recessed part, the first recessed part may have a first groove part and a second groove part, and the second groove part may be disposed between the first groove part and the third recessed part, and may have a depth deeper than a depth of the first groove part.

In the wavelength conversion element according to the aspect of the present disclosure, the second surface of the wavelength conversion section and a surface located between the third recessed part and the second groove part of the base member may have contact with each other.

The wavelength conversion element according to the aspect of the present disclosure may further include a communication hole configured to communicate the space and an external space with each other.

In the wavelength conversion element according to the aspect of the present disclosure, the wavelength conversion section may have a wavelength conversion layer, and a dielectric multilayer disposed on a surface of the wavelength conversion layer opposed to the reflecting surface.

An illumination device according to another aspect of the present disclosure includes the wavelength conversion element according to the aspect of the present disclosure, and a light source configured to emit the excitation light toward the wavelength conversion element.

The illumination device according to the aspect of the present disclosure may further include a rotary device, wherein the wavelength conversion element may be made rotatable around a rotary shaft, and the rotary device rotates the wavelength conversion element around the rotary shaft.

A projector according to another aspect of the present disclosure includes the illumination device according to the aspect of the present disclosure, a light modulation device configured to modulate the light from the illumination device in accordance with image information, and a projection optical device configured to project the light modulated by the light modulation device.

DESCRIPTION OF EXEMPLARY EMBODIMENTS

First Embodiment

Hereinafter, a first embodiment of the present disclosure will be described using FIG. 1 through FIG. 4.

It should be noted that in each of the drawings described below, the constituents are shown with the scale ratios of respective sizes set differently between the constituents in some cases in order to facilitate the visualization of each of the constituents.

An example of a projector according to the present embodiment will be described.

The projector according to the present embodiment is a projection-type image display device for displaying a color picture on a screen (a projection target surface). The projector is provided with three light modulation devices corresponding respectively to colored light, namely red light, green light, and blue light. The projector is provided with semiconductor lasers with which high-intensity and high-power light can be obtained as light sources of an illumination device.

Figure 1:
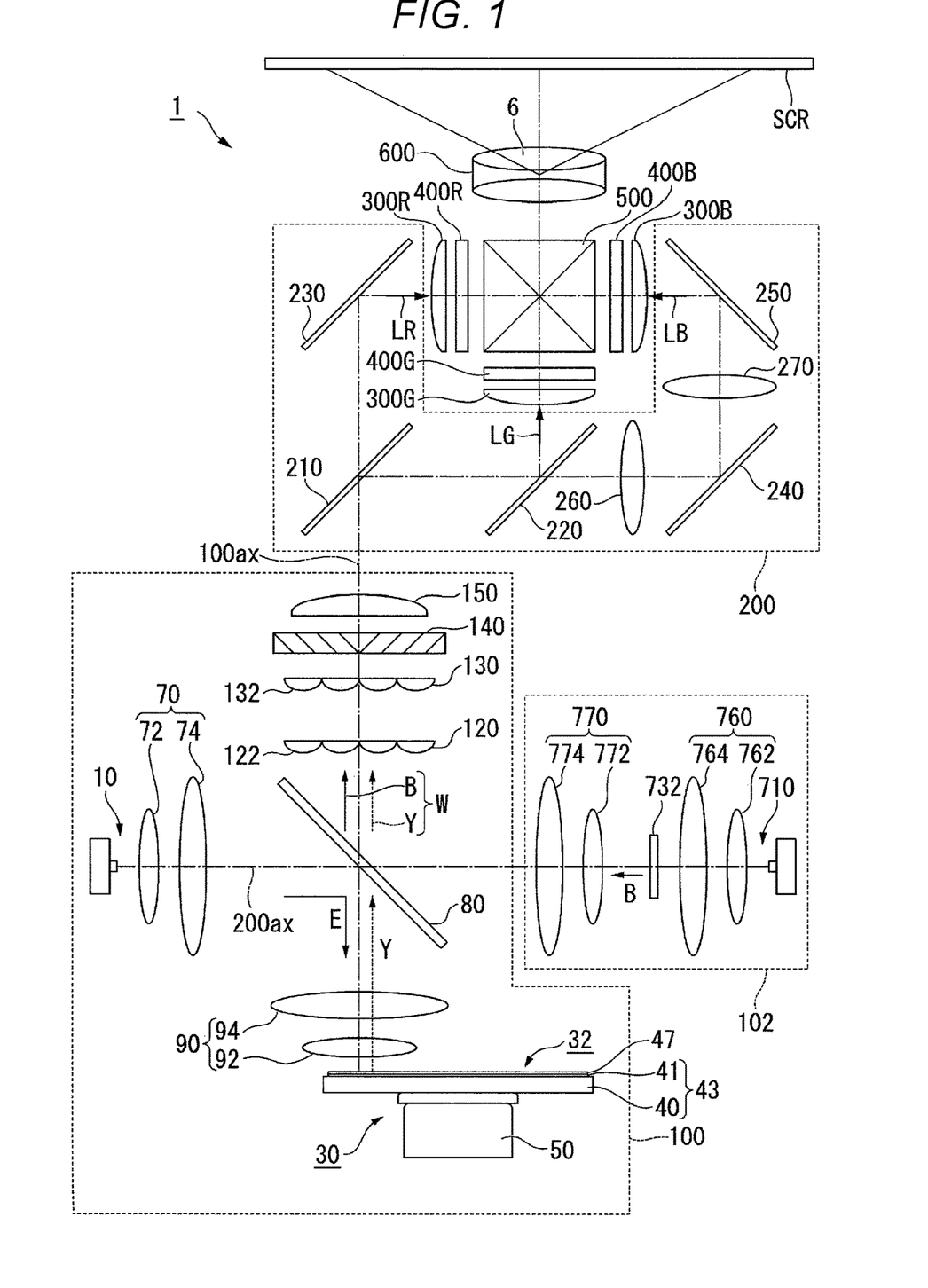
FIG. 1 is a schematic configuration diagram of a projector according to a first embodiment.

FIG. 1 is a schematic diagram showing an optical system of a projector 1 according to the present embodiment.

As shown in FIG. 1, the projector 1 according to the present embodiment is provided with a first illumination device 100, a second illumination device 102, a color separation light guide optical system 200, a light modulation device 400R, a light modulation device 400G, a light modulation device 4B, a light combining element 500, and a projection optical device 600.

The first illumination device 100 according to the present embodiment corresponds to an illumination device in the appended claims.

The first illumination device 100 is provided with a first light source 10, a collimating optical system 70, a dichroic mirror 80, a collimating light collection optical system 90, a wavelength conversion device 30, a first lens array 120, a second lens array 130, a polarization conversion element 140, and a superimposing lens 150.

The first light source 10 is formed of a semiconductor laser for emitting excitation light E as blue light which has a peak of the emission intensity at a wavelength of, for example, 445 nm, and has a wavelength range in a first wavelength band of, for example, 440 through 450 nm. It is possible for the first light source 10 to be formed of a single semiconductor laser, or to be formed of a plurality of semiconductor lasers. The first light source 10 is disposed so that a light axis $200ax$ of the laser beam emitted from the first light source 10 is perpendicular to an illumination light axis $100ax$. It should be noted that as the first light source 10, it is also possible to use a semiconductor laser for emitting the excitation light having a peak wavelength other than 445 nm, for example, a peak wavelength of 460 nm.

The first light source 10 according to the present embodiment corresponds to a light source in the appended claims.

The collimating optical system 70 is provided with a first lens 72 and a second lens 74. The collimating optical system 70 substantially collimates the light emitted from the first light source 10. The first lens 72 and the second lens 74 are each formed of a convex lens.

The dichroic mirror 80 is disposed in a light path between the collimating optical system 70 and the collimating light collection optical system 90 so as to cross each of the light axis $200ax$ of the first light source 10 and the illumination light axis $100ax$ at an angle of 45°. The dichroic mirror 80 reflects the excitation light E, and transmits fluorescence Y as yellow light including a red light component and a green light component.

The collimating light collection optical system 90 has a function of making the excitation light E having been transmitted through the dichroic mirror 80 converge to enter a wavelength conversion section 47 of the wavelength conversion device 30, and a function of substantially collimating the fluorescence Y emitted from the wavelength conversion device 30. The collimating light collection optical system 90 is provided with a first lens 92 and a second lens 94. The first lens 92 and the second lens 94 are each formed of a convex lens.

The second illumination device 102 is provided with a second light source device 710, a light collection optical system 760, a diffuser plate 732, and a collimating optical system 770.

The second light source 710 is formed of the same semiconductor laser as the first light source 10 of the first illumination device 100. It is possible for the second light source 710 to be formed of a single semiconductor laser, or to be formed of a plurality of semiconductor lasers. Further, it is also possible for the second light source 710 to be formed of a semiconductor laser different in wavelength band from the semiconductor laser of the first light source 10.

The light collection optical system 760 is provided with a first lens 762 and a second lens 764. Blue light B emitted from the second light source 710 is converged by the light collection optical system 760 on a diffusion surface of the diffuser plate 732 or in the vicinity of the diffuser plate 732. The first lens 762 and the second lens 764 are each formed of a convex lens.

The diffuser plate 732 diffuses the blue light B from the second light source 710 to thereby generate the blue light B having a light distribution similar to the light distribution of the fluorescence Y having been emitted from the wavelength conversion device 30. As the diffuser plate 732, there can be used, for example, obscured glass made of optical glass.

The collimating optical system 770 is provided with a first lens 772 and a second lens 774. The collimating optical system 770 substantially collimates the light emitted from the diffuser plate 732. The first lens 772 and the second lens 774 are each formed of a convex lens.

The blue light B having been emitted from the second light source device 102 is reflected by the dichroic mirror 80, and then combined with the fluorescence Y having been emitted from the wavelength conversion device 30 and then transmitted through the dichroic mirror 80 to thereby turn to white light W. The white light W enters the first lens array 120. The detailed configuration of the wavelength conversion device 30 will be described later.

The first lens array 120 has a plurality of first lenses 122 for dividing the light from the dichroic mirror 80 into a plurality of partial light beams. The plurality of first lenses 122 is arranged in a matrix in a plane perpendicular to the illumination light axis 100ax.

The second lens array 130 has a plurality of second lenses 132 corresponding respectively to the plurality of first lenses 122 of the first lens array 120. The second lens array 130 forms the image of each of the first lenses 122 constituting the first lens array 120 in the vicinity of the image forming area of each of the light modulation device 400R, the light modulation device 400G, and the light modulation device 400B in cooperation with the superimposing lens 150 located in the posterior stage. The plurality of second lenses 132 is arranged in a matrix in a plane perpendicular to the illumination light axis 100ax.

The plurality of partial light beams divided into by the first lens array 120 is converted by the polarization conversion element 140 into linearly-polarized light beams aligned in the polarization direction with each other.

The partial light beams emitted from the polarization conversion element 140 are converged by the superimposing lens 150 and are superimposed on each other in the vicinity of the image forming area of each of the light modulation device 400R, the light modulation device 400G, and the light modulation device 400B. The first lens array 120, the second lens array 130, and the superimposing lens 150 constitute an integrator optical system for homogenizing the in-plane light intensity distribution of the light from the wavelength conversion device 30.

The color separation light guide optical system 200 is provided with a dichroic mirror 210, a dichroic mirror 220, a reflecting mirror 230, a reflecting mirror 240, a reflecting mirror 250, a relay lens 260, and a relay lens 270. The color separation light guide optical system 200 separates the white light W obtained from the first illumination device 100 and the second illumination device 102 into red light LR, green light LG, and blue light LB, and then guides the red light LR, the green light LG, and the blue light LB to the corresponding light modulation devices 400R, 400G, and 400B.

A field lens 300R is disposed between the color separation light guide optical system 200 and the light modulation device 400R. A field lens 300G is disposed between the color separation light guide optical system 200 and the light modulation device 400G. A field lens 300B is disposed between the color separation light guide optical system 200 and the light modulation device 400B.

The dichroic mirror 210 transmits the red light component and reflects the green light component and the blue light component. The dichroic mirror 220 reflects the green light component, and transmits the blue light component. The reflecting mirror 230 reflects the red light component. The reflecting mirror 240 and the reflecting mirror 250 reflect the blue light component.

The red light having been transmitted through the dichroic mirror 210 is reflected by the reflecting mirror 230, and is then transmitted through the field lens 300R to enter the image forming area of the light modulation device 400R for the red light. The green light having been reflected by the dichroic mirror 210 is further reflected by the dichroic mirror 220, then transmitted through the field lens 300G, and then enters the image forming area of the light modulation device 400G for the green light. The blue light having been transmitted through the dichroic mirror 220 enters the image forming area of the light modulation device 400B for the blue light via the relay lens 260, the reflecting mirror 240 on the incident side, the relay lens 270, the reflecting mirror 250 on the exit side, and the field lens 300B.

The light modulation device 400R, the modulation device 400G, and the light modulation device 400B each modulate the colored light as the incident light in accordance with the image information to thereby form the image light. The light modulation device 400R, the light modulation device 400G, and the light modulation device 400B are each formed of a liquid crystal light valve. Although not shown in the drawings, on the light incident side of each of the light modulation device 400R, the light modulation device 400G, and the light modulation device 400B, there is disposed an incident side polarization plate. On the light exit side of each of the light modulation device 400R, the light modulation device 400G, and the light modulation device 400B, there is disposed an exit side polarization plate.

The light combining element 500 combines the image light emitted from the light modulation device 400R, the image light emitted from the light modulation device 400G, and the image light emitted from the light modulation device 400B with each other to form full-color image light. The light combining element 500 is formed of a cross dichroic prism having four rectangular prisms bonded to each other to have a substantially square shape in the plan view. On the boundary surfaces having a substantially X shape on which the rectangular prisms are bonded to each other, there are formed dielectric multilayers.

The image light having been emitted from the light combining element 500 is projected by the projection optical device 600 in an enlarged manner to form an image on a screen SCR. In other words, the projection optical device 600 projects the light modulated by the light modulation device 400R, the light modulated by the light modulation device 400G, and the light modulated by the light modulation device 400B. The projection optical device 600 is formed of a plurality of projection lenses 6.

The wavelength conversion device 30 will hereinafter be described.

Figure 2:
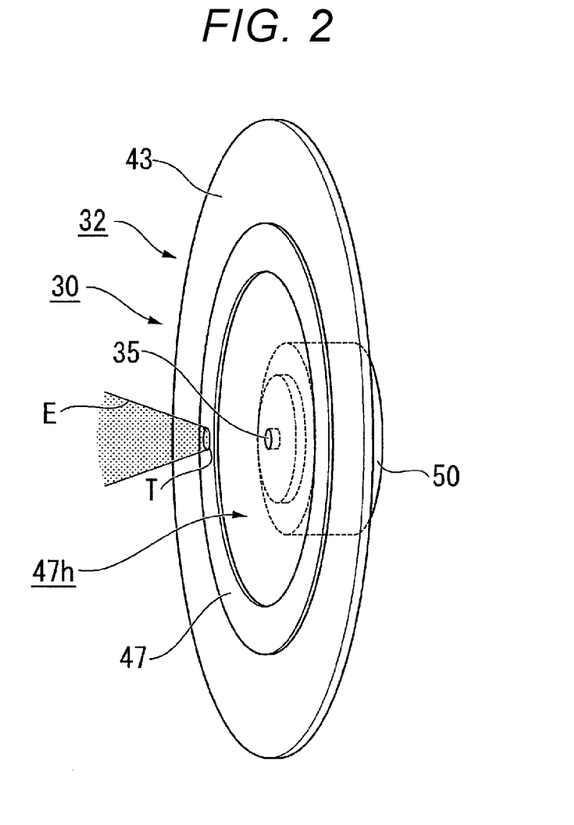
FIG. 2 is a perspective view of a wavelength conversion device according to the first embodiment.
Figure 3:
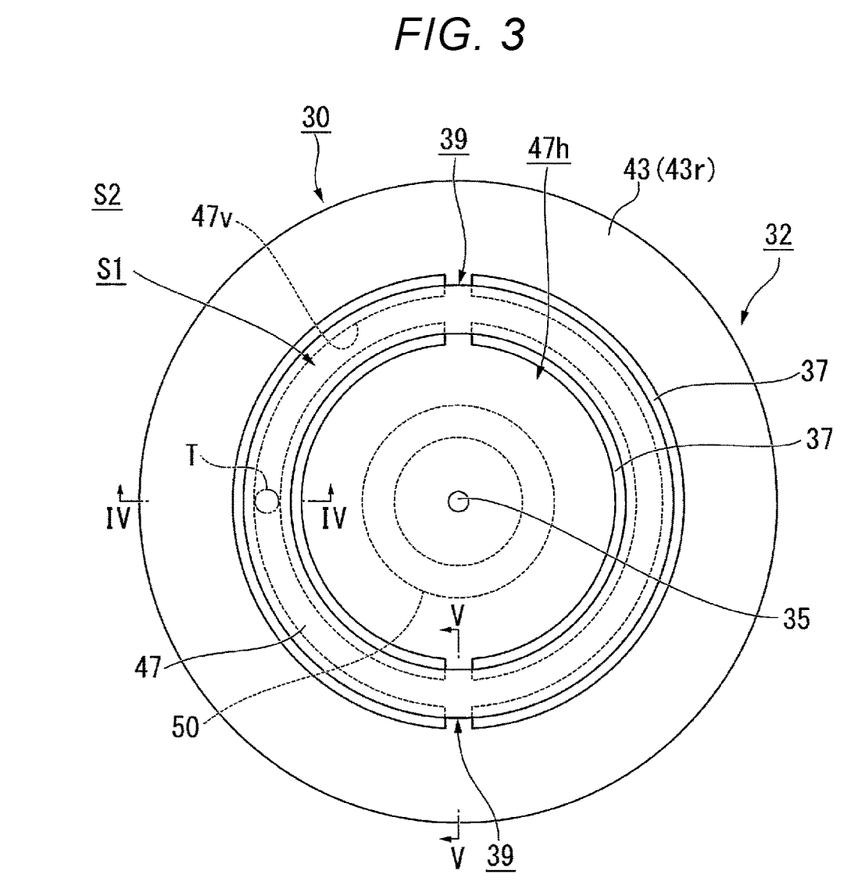
FIG. 3 is a front view of the wavelength conversion device.
Figure 4:
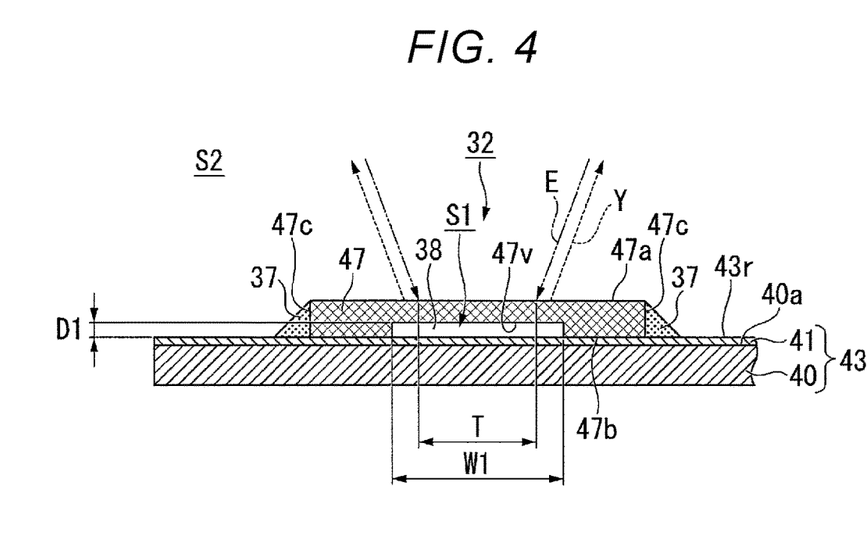
FIG. 4 is a cross-sectional view of a wavelength conversion element along the line IV-IV shown in FIG. 3.
Figure 5:
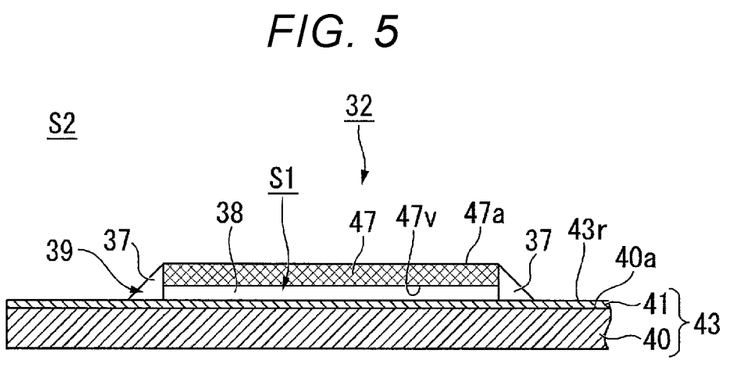
FIG. 5 is a cross-sectional view of the wavelength conversion element along the line V-V shown in FIG. 3.

FIG. 2 is a perspective view showing the wavelength conversion device 30. FIG. 3 is a plan view of the wavelength conversion device 30. FIG. 4 is a cross-sectional view of a wavelength conversion element 32 along the line IV-IV shown in FIG. 3. FIG. 5 is a cross-sectional view of the wavelength conversion element 32 along the line V-V shown in FIG. 3.

As shown in FIG. 2 and FIG. 3, the wavelength conversion device 30 is provided with the wavelength conversion element 32 and a motor 50 (a rotary device).

The wavelength conversion element 32 is made rotatable around a rotary shaft 35. The motor 50 rotates the wavelength conversion element 32 around the rotary shaft 35.

As shown in FIG. 4 and FIG. 5, the wavelength conversion element 32 is provided with a base member 43, the wavelength conversion section 47, holding sections 37, and an air layer 38. The wavelength conversion element 32 emits the fluorescence Y toward the same side as the side which the excitation light E enters. In other words, the wavelength conversion element 32 is a reflective-type wavelength conversion element.

The base member 43 has a base member main body 40 and a reflecting layer 41. The base member main body 40 is formed of a material including metal. As an example, the base member main body 40 is formed of a plate member made of metal high in thermal conductivity such as aluminum or copper. As shown in FIG. 3, the shape of the base member 43 when viewed from the incident direction of the excitation light E is a circular shape.

The reflecting layer 41 is disposed on the entire area of a first surface 40a of the base member main body 40. The reflecting layer 41 reflects the fluorescence Y emitted from a second surface 47b of the wavelength conversion section 47 and the excitation light E. The reflecting layer 41 is formed of metal high in reflectance such as silver. The reflecting layer 41 is designed to reflect the fluorescence Y and the excitation light E at high reflectance. Therefore, in order to form the smooth reflecting layer 41, the first surface 40a of the base member main body 40 is provided with high smoothness. Thus, the reflecting layer 41 reflects a large proportion of the fluorescence Y toward the upper side (on the opposite side to the base member main body 40) of FIG. 4. Therefore, the base member 43 is provided with a reflecting surface 43r for reflecting the fluorescence Y.

It should be noted that it is also possible for a protective film not shown to be disposed on the incident side of the excitation light E in the reflecting layer 41. As the protective film, there is used a transparent film made of, for example, $SiO_2$ or $Al_2O_3$. When the protective film is disposed, the reflecting layer 41 is protected from the external atmosphere, and at the same time, the fluorescence Y having entered the surface of the base material 43 at a variety of angles can be reflected at high reflectance. Further, it is also possible for a protective layer not shown for protecting the reflecting layer 41 from deterioration to be disposed between the reflecting film 41 and the first surface 40a of the base member main body 40.

As shown in FIG. 2 and FIG. 3, the wavelength conversion section 47 has a ring-like shape having an opening 47h on the periphery of the rotary shaft 35 of the base member 43. In other words, the wavelength conversion section 47 is disposed so as to surround the rotary shaft 35 on the reflecting surface 43r side of the base member 43.

As shown in FIG. 4 and FIG. 5, the wavelength conversion section 47 is formed of a wavelength conversion layer. Further, the wavelength conversion section 47 has a first surface 47a which the excitation light E in the first wavelength band enters, a second surface 47b opposed to the base member 43, and a third surface 47c crossing the first surface 47a or the second surface 47b.

The wavelength conversion section 47 includes a ceramic phosphor for performing the wavelength conversion on the excitation light E into the fluorescence Y in the different wavelength band from the wavelength band of the excitation light E. In other words, the wavelength conversion section 47 performs the wavelength conversion on the excitation light E into the fluorescence Y in a second wavelength band different from the first wavelength band. The second wavelength band is, for example, 490 through 750 nm, and the fluorescence Y is the yellow light including the red light component and the green light component. It should be noted that it is also possible for the wavelength conversion section 47 to include a single-crystal phosphor.

The wavelength conversion section 47 includes, for example, an yttrium aluminum garnet (YAG) phosphor. Citing YAG:Ce including cerium (Ce) as an activator agent as an example, as the wavelength conversion section 47, there can be used a material obtained by mixing raw powder including constituent elements such as $Y_2O_3$ $Al_2O_3$ and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process or a thermal plasma process.

The second surface 47b of the wavelength conversion section 47 is provided with a second recessed part 47v. The second recessed part 47v is disposed at substantially the center in the width direction of the wavelength conversion section 47. The shape of the second recessed part 47v viewed from the incident direction of the excitation light E is a ring-like shape. A dimension W1 of the second recessed part 47v in the width direction of the wavelength conversion section 47 is larger than that of an incident area T described later of the excitation light E. Further, a depth D1 of the second recessed part 47v is only required to be several micrometers, and is, for example, 3 µm. It should be noted that a "width direction of the wavelength conversion section 47" corresponds to a "radial direction of the base member 43 having a disk-like shape."

Air exists in an internal space S1 surrounded by the second recessed part 47v provided to the wavelength conversion section 47, and the reflecting surface 43r of the base member 43, and there is formed the air layer 38 including the air. In the first surface 47a of the wavelength conversion section 47, at least a part of a portion opposed to the reflecting surface 43r and the air layer 38 is set as the incident area T of the excitation light E.

As shown in FIG. 4, the holding sections 37 each have an adhesive for bonding the third surface 47c of the wavelength conversion section 47 and the base member 43 to each other. Therefore, the holding sections 37 are each disposed so as to have contact with the third surface 47c of the wavelength conversion section 47 and the reflecting surface 43r of the base member 43. Further, the second surface 47b of the wavelength conversion section 47 and the reflecting surface 43r of the base member 43 have contact with each other, and there is no gap between the second surface 47b of the wavelength conversion section 47 and the reflecting surface 43r of the base member 43, and therefore, the adhesive does not enter this place. Further, the adhesive does not enter the internal space S1. It is desirable for the holding sections 37 to be formed of a transparent adhesive in order to suppress unwanted absorption and reflection of the excitation light E and the fluorescence Y as the incident light. As the adhesive of this kind, there is used, for example, silicone resin, epoxy resin, acrylic resin, or an inorganic adhesive each having a thermal curing property.

The holding sections 37 are disposed respectively along the third surface 47c at both ends of the wavelength conversion section 47. In other words, as shown in FIG. 3, the holding sections 37 are disposed respectively along the third surface 47c located on the inner circumference side of the wavelength conversion section 47 and the third surface 47c located on the outer circumference side of the wavelength conversion section 47.

As shown in FIG. 3 and FIG. 5, communication holes 39 for communicating the internal space S1 and an external space S2 of the wavelength conversion section 47 with each other are disposed at two places in the circumferential direction of the wavelength conversion section 47. The communication holes 39 each extend in a direction parallel to the reflecting surface 43r of the base member 43 to communicate the internal space S1 and the external space S2 with each other. The holding sections 37 are disposed respectively along the inner circumference side and the outer circumference side of the wavelength conversion section 47, but are each interrupted at the positions of the two communication holes 39. Therefore, there is no chance that the opening part of each of the communication holes 39 is blocked by the adhesive constituting the holding sections 37.

The number and the arrangement of the communication holes 39 are not limited to the example in the present embodiment.

By disposing the communication holes 39, the internal space S1 surrounded by the second recessed part 47v of the wavelength conversion section 47 and the reflecting surface 43r of the base member 43 fails to become an enclosed space, but becomes a space communicated with the external space S2 of the wavelength conversion element 32. Thus, the air can freely move between the internal space S1 and the external space S2 of the wavelength conversion section 47 via the communication holes 39.

When the excitation light E has entered the wavelength conversion section 47, heat is generated in the wavelength conversion section 47. In the present embodiment, by rotating the wavelength conversion element 32 with the motor 50, the incident position of the excitation light E in the wavelength conversion section 47 is moved temporally. Thus, it is possible to prevent the wavelength conversion section 47 from being deteriorated by always irradiating the same position of the wavelength conversion section 47 with the excitation light E to thereby locally heat only a part of the wavelength conversion section 47. In FIG. 3, the incident area of the excitation light E is represented by the incident area T.

In the wavelength conversion element 32 in the present embodiment, the fluorescence Y having isotropically been radiated inside the wavelength conversion section 47 proceeds inside the wavelength conversion section 47 while colliding with and being scattered by scattering components such as voids, and then a part of the fluorescence Y reaches the first surface 47a of the wavelength conversion section 47, and another part of the fluorescence Y reaches the second surface 47b of the wavelength conversion section 47. Except a component entering the first surface 47a at an angle no smaller than the critical angle to thereby totally be reflected, and a component entering the first surface 47a at an angle smaller than the critical angle to thereby cause the Fresnel reflection, a component of the fluorescence Y having reached the first surface 47a passes through the first surface 47a, and is emitted from the wavelength conversion element 32. Further, the two reflected components described above proceed inside the wavelength conversion section 47 while being scattered again to reach the first surface 47a or the second surface 47b.

In contrast, in the fluorescence Y having reached the second surface 47b, the light having entered the second surface 47b at an incident angle no smaller than the critical angle proceeds inside the wavelength conversion section 47 while being scattered again without being lost due to the total reflection.

Further, in the fluorescence Y having entered the second surface 47b at the incident angle smaller than the critical angle, the component having not been reflected by the second surface 47b passes through the second surface 47b to reach the reflecting layer 41 of the base member 43, and is then reflected by the reflecting layer 41. However, even though the reflecting layer 41 made of silver is high in reflectance, since an absorptance of about 2% is provided, the fluorescence Y attenuates every time the fluorescence Y enters the reflecting layer 41. In the fluorescence Y generated inside the wavelength conversion section 47, a large proportion of the component not emitted from the wavelength conversion element 32 corresponds to the absorption component in the reflecting layer 41. Therefore, in order to increase the luminous efficiency, it is important to make most of the fluorescence Y be reflected by the second surface 47b to prevent the fluorescence Y from entering the reflecting layer 41 as much as possible.

In the present specification, the "luminous efficiency" is defined as the formulas (1), (2) below.

(luminous efficiency)=(intensity of light emitted from wavelength conversion section)/(intensity of excitation light entering wavelength conversion section) (1)

(intensity of light emitted from wavelength conversion section)=(intensity of fluorescence emitted)+(intensity of non converted excitation light emitted) (2)

The radiation distribution of the fluorescence Y in the inside of the wavelength conversion section 47 is substantially isotropic toward all directions. Therefore, the smaller the critical angle on the second surface 47b is, the more the fluorescence Y reflected by the second surface 47b is increased, and the more the fluorescence Y entering the reflecting layer 41 is decreased. Here, according to the wavelength conversion element 32 in the present embodiment, since the air layer 38 is disposed below the incident area T of the excitation light E corresponding to the principal luminous area of the wavelength conversion section 47, it is possible to decrease the critical angle on the second surface 47b compared to the related-art wavelength conversion element not provided with the air layer. Thus, since it is possible to reduce the amount of the fluorescence Y entering the reflecting layer 41 to reduce the loss of the fluorescence Y in the reflecting layer 41, it is possible to increase the luminous efficiency.

Further, the heat generated by the wavelength conversion is transferred from the wavelength conversion section 47 to the base member 43, then diffused throughout the entire area of the base member 43, and then emitted from the entire surface of the base member 43. Therefore, when the thermal resistance of the member intervening between the wavelength conversion section 47 and the base member 43 is high, sufficient heat rejection is not achieved to raise the temperature of the wavelength conversion section 47, and thus, there arises a problem that thermal quenching occurs to decrease the luminous efficiency.

In regard to this problem, in the wavelength conversion element 32 in the present embodiment, since the thickness of the air layer 38 intervening between the wavelength conversion section 47 and the base member 43 is as thin as several micrometers, even with the air low in thermal conductivity, there is no chance for the thermal resistance to rise dramatically. Further, in other areas than the area where the second recessed part 47v is disposed of the wavelength conversion section 47, since the second surface 47b of the wavelength conversion section 47 and the reflecting surface 43r of the base member 43 have contact with each other, the heat of the wavelength conversion section 47 is sufficiently transferred to the base member 43. Due to these factors, in the wavelength conversion element 32 in the present embodiment, the rise in temperature of the wavelength conversion section 47 is suppressed, and it is possible to keep high luminous efficiency.

Further, according to the configuration of the present embodiment, it is possible to adjust the thickness of the air layer 38 by adjusting the depth of the second recessed part 47v and it is possible to control the thermal resistance within the range in which the thermal resistance does not dramatically rise. Thus, it is possible to prevent the phenomenon that the heat rejection performance from the wavelength conversion section 47 decreases due to an increase in thickness of the air layer 38, and thus the luminous efficiency of the phosphor decreases due to the thermal quenching caused by the rise in temperature of the phosphor, and the phenomenon that the luminous efficiency decreases due to a decrease in the Fresnel reflectance of the phosphor-air interface caused by a decrease in thickness of the air layer 38.

It should be noted that the configuration of disposing an air layer between the wavelength conversion section and the reflecting layer of the base member is also disclosed in Document 1 described above. However, in the light source device in Document 1 it is assumed that the excitation light is made to enter a surface larger in area out of the surfaces of the wavelength conversion section having a rectangular solid shape, and the fluorescence is emitted from a surface smaller in area for the purpose of obtaining the fluorescence narrow in angle distribution. Therefore, the air layer is disposed on the surface opposed to the fluorescence exit surface, namely the surface smaller in area, but the air layer is not disposed on the surface opposed to the plane of incidence of the excitation light, namely the surface larger in area. Therefore, since most of the light enters the reflecting layer without the intervention of the air layer, an improvement in luminous efficiency can hardly be expected. In this regard, in the wavelength conversion element 32 in the present embodiment, since most of the light enters the second surface 47b of the wavelength conversion section 47 provided with the air layer 38, it is possible to sufficiently increase the luminous efficiency while keeping the thermal conduction from the wavelength conversion section 47 to the base member 43.

In the wavelength conversion element 32 in the present embodiment, since there are disposed the communication holes 39 for communicating the internal space S1 surrounded by the second recessed part 47v of the wavelength conversion section 47 and the base member 43 and the external space S2 with each other, it is possible for the air to freely move between the internal space S1 and the external space S2. Therefore, it is possible to prevent the phenomenon that the air layer 38 expands to enlarge the internal space S1 due to the rise in temperature when the fluorescence Y is emitted from the wavelength conversion section 47, and thus the thermal resistance between the wavelength conversion section 47 and the base member 43 increases. Thus, it is possible to suppress the decrease in luminous efficiency due to the increase in thermal resistance. Further, it is possible to prevent the phenomenon that the air layer 38 expands due to the rise in temperature of the wavelength conversion section 47, and thus the wavelength conversion section 47 is damaged. Moreover, it is possible to prevent the phenomenon that the air layer 38 expands due to the rise in temperature of the wavelength conversion section 47, and thus the wavelength conversion section 47 exfoliates or separates from the base member 43. Further, it is possible to prevent a harmful effect that the air is compressed in the internal space S1 when bonding the wavelength conversion section 47 and the base member 43 to each other to make the bonding difficult in the manufacturing process of the wavelength conversion element 32.

According to the first illumination device 100 related to the first embodiment described hereinabove, the following advantages are exerted.

The first illumination device 100 according to the present embodiment is equipped with the wavelength conversion element 32 described above, and is therefore capable of suppressing the light loss in the wavelength conversion element.

Further, the first illumination device 100 according to the present embodiment is capable of temporally moving the incident position of the excitation light E on the wavelength conversion section 47 with the motor 50 (the rotary device), and can therefore suppress the rise in temperature of the wavelength conversion section 47. Therefore, it is possible to suppress the decrease in luminous efficiency of the wavelength conversion section 47, and at the same time, it is possible to provide the first illumination device 100 small in loss of the fluorescence Y.

According to the projector 1 related to the first embodiment described hereinabove, the following advantages are exerted.

The projector 1 according to the present embodiment is equipped with the first illumination device 100 described above, and can therefore display a high-intensity image.

Second Embodiment

A second embodiment of the present disclosure will hereinafter be described using FIG. 6.

The configurations of a projector and an illumination device according to the second embodiment are substantially the same as those in the first embodiment, and the configuration of the wavelength conversion element is different from that of the first embodiment. Therefore, the description of the whole of the projector and the illumination device will be omitted.

Figure 6:
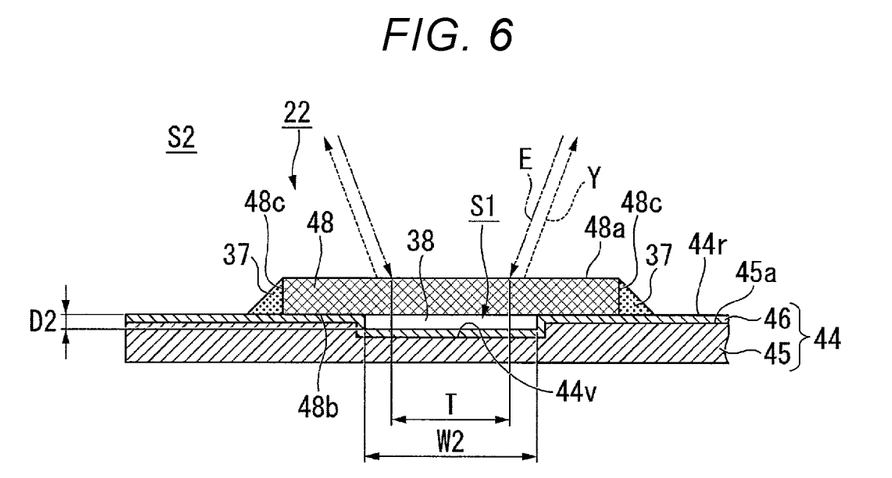
FIG. 6 is a cross-sectional view of a wavelength conversion element according to a second embodiment.

FIG. 6 is a cross-sectional view of a wavelength conversion element 22 according to the second embodiment. Similarly to FIG. 4, the cross-sectional view corresponds to the cross-sectional surface at the position of the line IV-IV in FIG. 3.

In FIG. 6, the constituents common to those shown in FIG. 4 are denoted by the same reference symbols, and the description thereof will be omitted.

As shown in FIG. 6, the wavelength conversion element 22 is provided with a base member 44, a wavelength conversion section 48, the holding sections 37, and the air layer 38.

The base member 44 has a base member main body 45 and a reflecting layer 46. The base member 44 is provided with a first recessed part 44v. In detail, the first recessed part 44v is disposed on a first surface 45a of the base member main body 45, and the reflecting layer 46 is disposed on the entire surface of the base member main body 45 including a bottom surface and side surfaces of the first recessed part 44v. The first recessed part 44v is disposed at substantially the center in the width direction of the wavelength conversion section 48. A dimension W2 of the first recessed part 44v is larger than that of the incident area T of the excitation light E. Further, a depth D2 of the first recessed part 44v is only required to be several micrometers, and is, for example, 3 μm. The base member 44 has a reflecting surface 44r.

The wavelength conversion section 48 has a first surface 48a which the excitation light E in the first wavelength band enters, a second surface 48b opposed to the base member 44, and a third surface 48c crossing the first surface 48a or the second surface 48b.

Air exists in the internal space S1 surrounded by the first recessed part 44v provided to the base member 44, and the second surface 48b of the wavelength conversion section 48, and there is formed the air layer 38 including the air. Although in the present embodiment, the reflecting layer 46 is disposed on the entire surface of the base member main body 45 including the bottom surface and the side surfaces of the first recessed part 44v, the reflecting layer 46 is not necessarily required to be disposed on the entire surface of the base member main body 45, and can be disposed, for example, only on the bottom surface of the first recessed part 44v.

The rest of the configuration of the wavelength conversion element 22 is substantially the same as that of the wavelength conversion element 32 in the first embodiment.

Also in the wavelength conversion element 22 according to the present embodiment, it is possible to obtain substantially the same advantage as that of the first embodiment such as the advantage that the light loss in the reflecting layer 46 can be suppressed to sufficiently increase the luminous efficiency while keeping the thermal conduction.

Third Embodiment

A third embodiment of the present disclosure will hereinafter be described using FIG. 7.

The configurations of a projector and an illumination device according to the third embodiment are substantially the same as those in the first embodiment, and the configuration of the wavelength conversion element is different from that of the first embodiment. Therefore, the description of the whole of the projector and the illumination device will be omitted.

Figure 7:
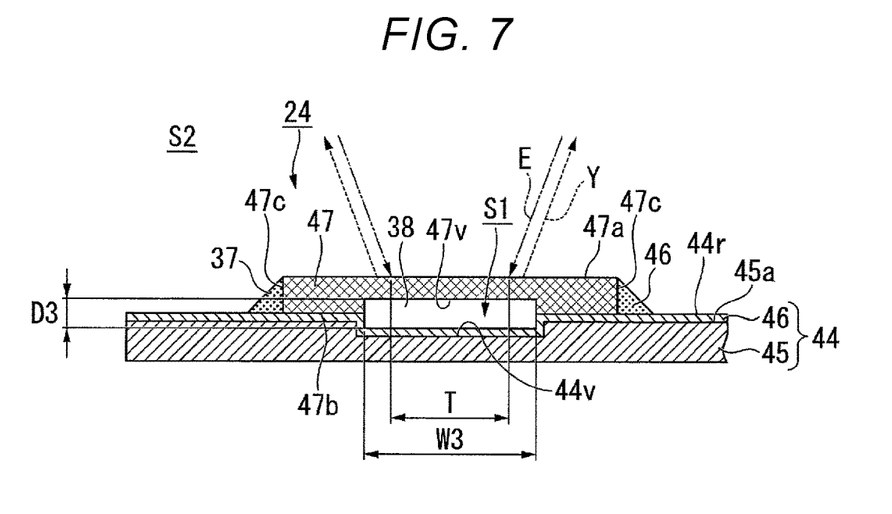
FIG. 7 is a cross-sectional view of a wavelength conversion element according to a third embodiment.

FIG. 7 is a cross-sectional view of a wavelength conversion element 24 according to the third embodiment. Similarly to FIG. 4, the cross-sectional view corresponds to the cross-sectional surface at the position of the line IV-IV in FIG. 3.

In FIG. 7, the constituents common to those shown in FIG. 4 and FIG. 6 are denoted by the same reference symbols, and the description thereof will be omitted.

As shown in FIG. 7, the wavelength conversion element is provided with the base member 44, the wavelength conversion section 47, the holding sections 37, and the air layer 38.

The base member 44 has the base member main body 45 and the reflecting layer 46. The base member 44 is provided with the first recessed part 44v. In detail, the first recessed part 44v is disposed on the first surface 45a of the base member main body 45, and the reflecting layer 46 is disposed on the entire surface of the base member main body 45 including the bottom surface and the side surfaces of the first recessed part 44v. Further, the second surface 47b of the wavelength conversion section 47 is provided with the second recessed part 47v. The first recessed part 44v and the second recessed part 47v are disposed at substantially the same positions in the width direction of the wavelength conversion section 47. Dimensions W3 of the first recessed part 44v and the second recessed part 47v in the width direction of the wavelength conversion section 47 are substantially the same as each other, and are larger than the diameter of the incident area T of the excitation light E. Further, a distance D3 between the bottom surface of the first recessed part 44v and the bottom surface of the second recessed part 47v is only required to be several micrometers, and is, for example, 3 μm.

Air exists in the internal space S1 surrounded by the first recessed part 44v provided to the base member 44, and the second recessed part 47v provided to the wavelength conversion section 47, and there is formed the air layer 38 including the air. Although in the present embodiment, the reflecting layer 46 is disposed on the entire surface of the base member main body 45 including the bottom surface and the side surfaces of the first recessed part 44v the reflecting layer 46 is not necessarily required to be disposed on the entire surface of the base member main body 45, and can be disposed, for example, only on the bottom surface of the first recessed part 44v.

The rest of the configuration of the wavelength conversion element 24 is substantially the same as that of the wavelength conversion element 32 in the first embodiment.

Also in the wavelength conversion element 24 according to the present embodiment, it is possible to obtain substantially the same advantage as that of the first embodiment such as the advantage that the light loss in the reflecting layer 46 can be suppressed to sufficiently increase the luminous efficiency while keeping the thermal conduction.

Fourth Embodiment

A fourth embodiment of the present disclosure will hereinafter be described using FIG. 8 through FIG. 10.

The configurations of a projector and an illumination device according to the fourth embodiment are substantially the same as those in the first embodiment, and the configuration of the wavelength conversion element is different from that of the first embodiment. Therefore, the description of the whole of the projector and the illumination device will be omitted.

Figure 8:
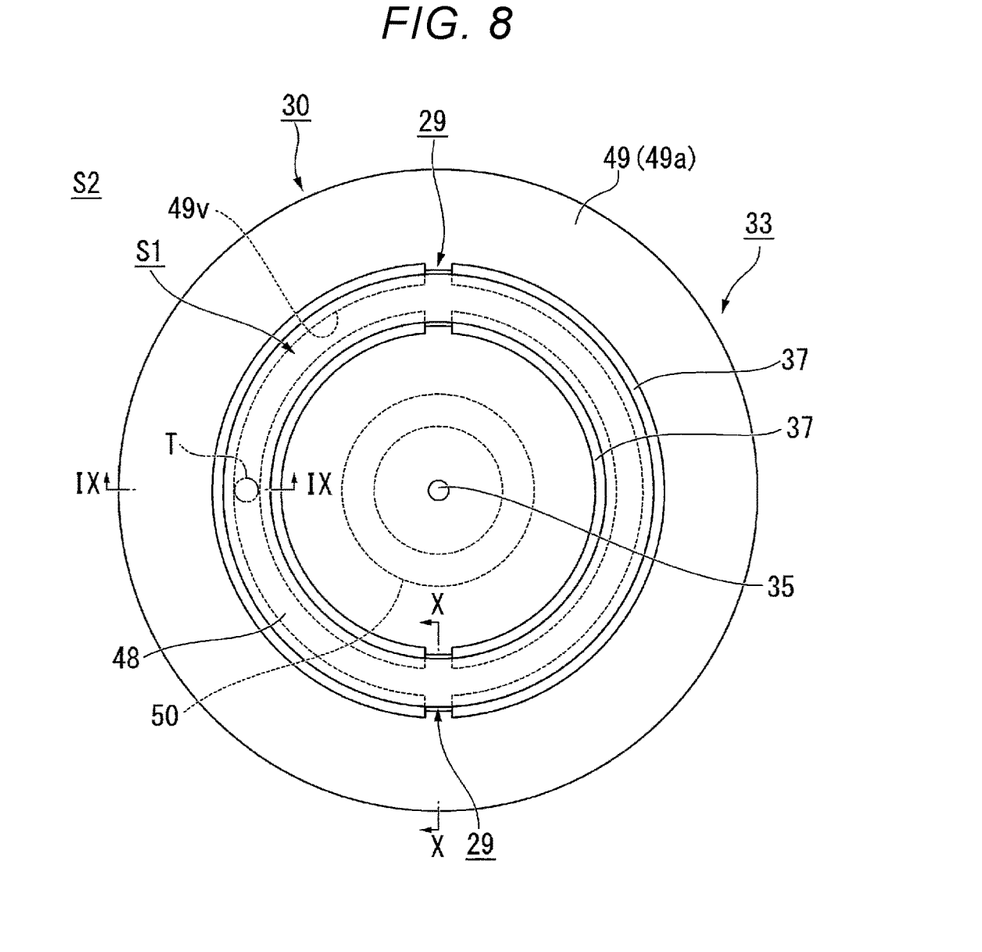
FIG. 8 is a front view of a wavelength conversion device according to a fourth embodiment.

FIG. 8 is a front view of a wavelength conversion device according to the fourth embodiment. FIG. 9 is a cross-sectional view of a wavelength conversion element along the line IX-IX shown in FIG. 8. FIG. 10 is a cross-sectional view of the wavelength conversion element along the line X-X shown in FIG. 8.

Figure 9:
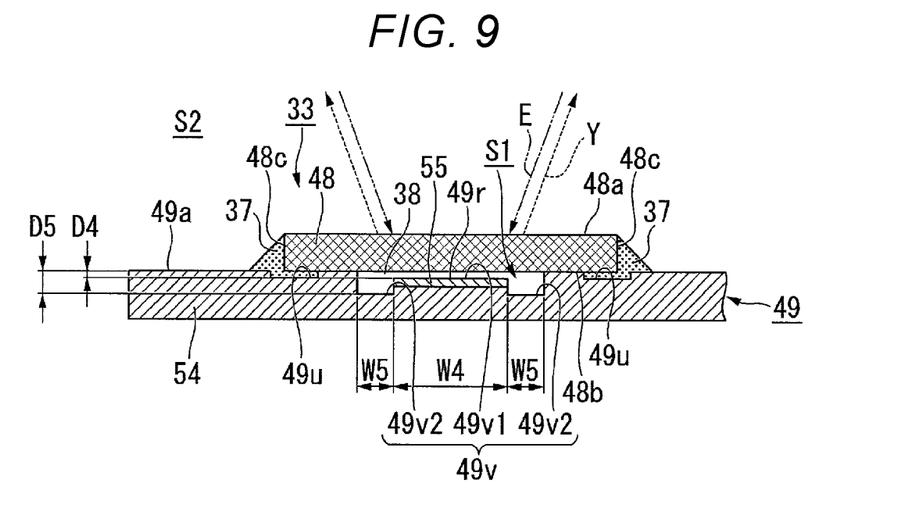
FIG. 9 is a cross-sectional view of a wavelength conversion element along the line IX-IX shown in FIG. 8.
Figure 10:
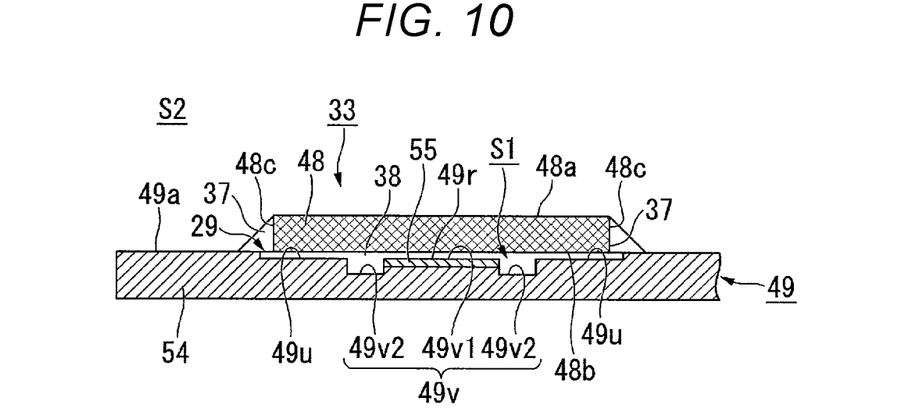
FIG. 10 is a cross-sectional view of the wavelength conversion element along the line X-X shown in FIG. 8.

In FIG. 8 through FIG. 10, the constituents common to the drawings used in the embodiments described above are denoted by the same reference symbols, and the description thereof will be omitted.

As shown in FIG. 8 through FIG. 10, a wavelength conversion element 33 is provided with a base member 49, the wavelength conversion section 48, the holding sections 37, and the air layer 38.

The base member 49 has a base member main body 54, and a reflecting layer 55 provided to a part of the base member main body 54. The base member main body 54 is formed of a material including metal. As an example, the base member main body 54 is formed of a plate member made of metal high in thermal conductivity such as aluminum or copper. In the present embodiment, the base member 49 has a first surface 49a opposed to the wavelength conversion section 48.

As shown in FIG. 9, the base member 49 has a first recessed part 49v and two third recessed parts 49u. Each of the third recessed parts 49u is at least partially opposed to the second surface 48b of the wavelength conversion section 48, and is disposed separately from the first recessed part 49v. The first recessed part 49v is disposed at substantially the center in the width direction of the wavelength conversion section 48. Each of the third recessed parts 49u is disposed in an end part in the width direction of the wavelength conversion section 48 so as to straddle an area below the wavelength conversion section 48 and an area located outside the wavelength conversion section 48.

The first recessed part 49v includes a first groove part 49v1 and two second groove parts 49v2. The second groove parts 49v2 are each disposed between the first groove part 49v1 and the third recessed part 49u. A depth D5 of the second groove parts 49v2 is deeper than a depth D4 of the first groove part 49v1. Further, a width W5 of each of the second groove parts 49v2 is narrower than a width W4 of the first groove part 49v1.

In the present embodiment, the reflecting layer 55 is disposed on the bottom surface of the first groove part 49v1. The reflecting layer 55 is formed of metal high in reflectance such as silver so as to reflect the fluorescence Y and the excitation light E at high reflectance. Therefore, the base member 49 is provided with a reflecting surface 49r for reflecting the fluorescence Y and the excitation light E. It should be noted that it is also possible for the reflecting layer 55 to be disposed not only on the bottom surface of the first groove part 49v1, but also on inner wall surfaces of the first recessed part 49v including the bottom surfaces and so on of the second groove parts 49v2, inner wall surfaces of the third recessed parts 49u, and the first surface 49a and so on of the base member 49.

The holding sections 37 each have an adhesive for bonding the third surface 48c of the wavelength conversion section 48 and the base member 49 to each other. Therefore, the holding sections 37 are each disposed so as to have contact with the third surface 48c of the wavelength conversion section 48 and the first surface 49a of the base member 49. In detail, a part of the adhesive constituting the holding section 37 is housed in the third recessed part 49u. Another part of the adhesive is disposed so as to be opposed to the third surface 48c of the wavelength conversion section 48.

Further, the second surface 48b of the wavelength conversion section 48 has contact with the first surface 49a of the base member 49 in an area located between the third recessed part 49u and the second groove part 49v2. Therefore, the adhesive does not infiltrate between the surface located between the third recessed part 49u and the second groove part 49v2, and the second surface 48b of the wavelength conversion section 48. Further, the adhesive does not enter the internal space S1. The holding sections 37 are each formed of, for example, silicone resin, epoxy resin, acrylic resin, or an inorganic adhesive each having a thermal curing property.

As shown in FIG. 8 and FIG. 10, communication holes 29 for communicating the internal space S1 and the external space S2 of the wavelength conversion section 48 with each other are disposed at two places in the circumferential direction of the base member 49. The communication holes 29 each extend in a direction parallel to the first surface 49a of the base member 49 to communicate the internal space S1 and the external space S2 with each other. The holding sections 37 are disposed respectively along the inner circumference side and the outer circumference side of the wavelength conversion section 48, but are each interrupted at the positions of the two communication holes 29. Therefore, there is no chance that the opening part of each of the communication holes 29 is blocked by the adhesive constituting the holding sections 37. The number and the arrangement of the communication holes 29 are not limited to the example in the present embodiment.

The rest of the configuration of the wavelength conversion element 33 is substantially the same as that of the wavelength conversion element 32 in the first embodiment.

Also in the wavelength conversion element 33 according to the present embodiment, it is possible to obtain substantially the same advantage as that of the first embodiment such as the advantage that the light loss in the reflecting layer 55 can be suppressed to sufficiently increase the luminous efficiency while keeping the thermal conduction.

Further, in the case of the present embodiment, the third recessed parts 49u are each disposed in a part of the base member 49 corresponding to the end part in the width direction of the wavelength conversion section 48, and a part of the adhesive is housed inside the third recessed part 49u. Therefore, the third recessed parts 49u each function as a space for housing a part of the adhesive. Further, since the adhesive is bonded to the third surface 48c of the wavelength conversion section 48 and a part of the first surface 49a, the adhesion area between the wavelength conversion section 48 and the base member 49 increases compared to the first embodiment, and thus, the bonding strength increases. Thus, the exfoliation of the wavelength conversion section 48 is prevented, and it is possible to increase the reliability of the wavelength conversion element 33.

Further, since the second surface 48b of the wavelength conversion section 48 and the first surface 49a of the base member 49 have contact with each other, it is possible to more precisely control the thickness of the air layer 38. Thus, it is possible to appropriately manage the thermal resistance when conducting the heat of the wavelength conversion section 48 to the base member 49.

Further, since the first surface 49a of the base member 49 has contact with the second surface 48b of the wavelength conversion section 48 in the area between the third recessed part 49u and the second groove part 49v2, the adhesive housed in the third recessed parts 49u is made difficult to flow into the first recessed part 49v. Further, in the first recessed part 49v, since the second groove parts 49v2 deeper than the first groove part 49v1 are disposed on both sides of the first groove part 49v1, even if the adhesive flows into the first recessed part 49v via a very narrow gap between the second surface 48b of the wavelength conversion section 48 and the first surface 49a of the base member 49, the adhesive is retained inside the second groove parts 49v2, and is difficult to reach the first groove part 49v1 provided with the reflecting layer 55. Thus, the adhesive is prevented from flowing onto the reflecting layer 55, and it is possible to suppress the decrease in luminous efficiency caused by the adhesive having flowed onto the reflecting layer 55.

Also in the present embodiment, since the communication holes 29 for communicating the internal space S1 and the external space S2 with each other are disposed, it is possible to improve the problems caused by the expansion of the air layer 38 such as a problem that the luminous efficiency decreases, a problem that the wavelength conversion section 48 is damaged, or a problem that the bonding of the wavelength conversion section 48 becomes difficult.

It is also possible for the wavelength conversion element according to the fourth embodiment to have the following configuration.

Modified Example

Figure 11:
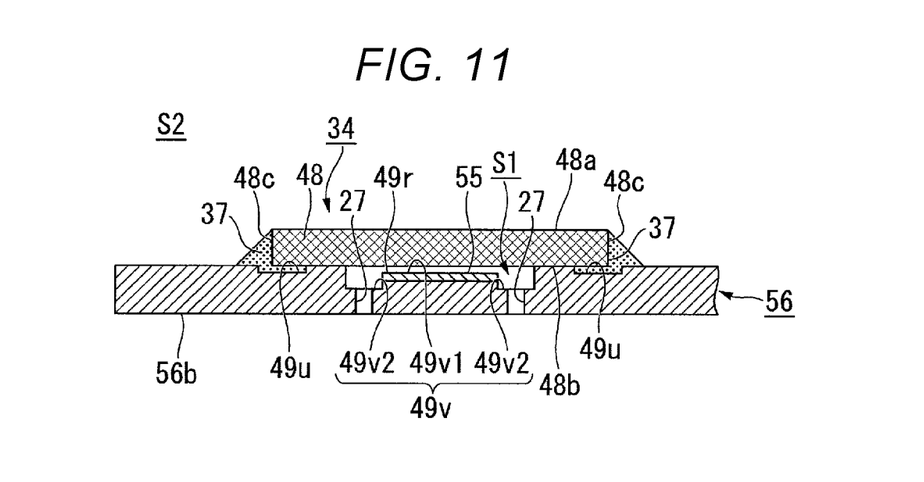
FIG. 11 is a cross-sectional view of a wavelength conversion element according to a modified example of the fourth embodiment.

FIG. 11 is a cross-sectional view of a wavelength conversion element 34 according to a modified example of the fourth embodiment.

In FIG. 11, the constituents common to those shown in FIG. 9 are denoted by the same reference symbols, and the description thereof will be omitted.

It should be noted that FIG. 11 corresponds to the cross-sectional view along the line IX-IX shown in FIG. 8.

As shown in FIG. 11, the wavelength conversion element 34 according to the modified example has communication holes 27 for communicating the internal space S1 of the wavelength conversion section 48 and the external space S2 with each other. The communication holes 27 are disposed respectively in the two second groove parts 49v2, extend in a direction crossing a reflecting surface 56r of a base member 56, and penetrate the base member 56 between the reflecting surface 56r and a second surface 56b. In the configuration of the modified example, it is possible for the holding members 37 to be disposed continuously without interruption throughout the entire circumference respectively on the inner circumferential side and the outer circumferential side of the wavelength conversion section 48. It should be noted that the communication holes 27 are respectively disposed in the two second groove parts 49v2 in FIG. 11, but can be disposed only either one of the second groove parts 49v2.

The rest of the configuration of the wavelength conversion element 34 is substantially the same as that of the wavelength conversion element 33 in the fourth embodiment.

Also in the present modified example, since the communication holes 27 for communicating the internal space S1 and the external space S2 with each other are disposed, it is possible to prevent the phenomenon that the radiation performance of the second surface 48b of the wavelength conversion section 48 deteriorates due to the expansion of the air layer 38, and thus the luminous efficiency decreases. Further, since the communication holes 27 are disposed, it is possible to prevent the wavelength conversion section 48 from being damaged, the bonding of the wavelength conversion section 48 from becoming difficult, or the like.

It should be noted that the scope of the present disclosure is not limited to the embodiments described above, but a variety of modifications can be provided thereto within the scope or the spirit of the present disclosure.

For example, in the wavelength conversion element according to any one of the embodiments described above, a dielectric multilayer can also be disposed on the second surface of the wavelength conversion section. The dielectric multilayer is formed of a film obtained by alternately stacking a plurality of layers of $SiO_2$ and a plurality of layers of $TiO_2$. In other words, the dielectric multilayer has a configuration having dielectric films of two types different in refractive index from each other alternately stacked on one another. The types and the number of layers of the dielectric films constituting the dielectric multilayer are not particularly limited.

When the dielectric multilayer is disposed on the second surface of the wavelength conversion section, it is possible for the dielectric multilayer to increase the amount of fluorescence to be reflected by the second surface out of the fluorescence which enters the second surface of the wavelength conversion section at an incident angle equal to or larger than the critical angle. Thus, it is possible to reduce the amount of fluorescence which reaches the reflecting surface of the base member to suppress the loss in the reflecting surface. As a result, it is possible to increase the luminous efficiency of the wavelength conversion element.

Further, although in the wavelength conversion element according to any one of the embodiments described above, the adhesive is used as the holding sections, the wavelength conversion section is not necessarily required to adhere to the base member. As the holding section, it is also possible to use a member such as a plate spring member which holds the wavelength conversion section by pressing the wavelength conversion section against the base member, or a belt-like member which restricts displacement of the wavelength conversion section in the state of surrounding the periphery of the wavelength conversion section to hold the wavelength conversion section to the base member.

Further, in the embodiments described above, there is cited an example of the wavelength conversion element which is made rotatable using the motor, but the present disclosure can also be applied to a stationary wavelength conversion element which is not made rotatable.

Besides the above, the specific descriptions of the shape, the number, the arrangement, the material, and so on of each of the constituents of the wavelength conversion device, the illumination device, and the projector are not limited to those of the embodiments described above, but can arbitrarily be modified. Although in each of the embodiments, there is described the example of installing the illumination device according to the present disclosure in the projector using the liquid crystal light valves, the example is not a limitation. The present disclosure can also be implemented in the projector using digital micromirror devices as the light modulation devices.

Although in each of the embodiments, there is described the example of installing the illumination device according to the present disclosure in the projector, the example is not a limitation. The illumination device according to the present disclosure can also be applied to lighting equipment, a headlight of a vehicle, and so on.

What is claimed is:

1. A wavelength conversion element comprising:
   a base member having a reflecting surface;
   a wavelength conversion section having a first surface which excitation light in a first wavelength band enters and a second surface opposed to the base member, and configured to perform a wavelength conversion on the excitation light into fluorescence in a second wavelength band different from the first wavelength band;
   a holding section configured to hold the wavelength conversion section to the base member; and
   an air layer disposed in one of a space surrounded by a first recessed part provided to the base member so as to be opposed to the second surface of the wavelength conversion section and the second surface of the wavelength conversion section, and a space surrounded by a second recessed part provided to the wavelength conversion section so as to be opposed to the reflecting surface of the base member and the reflecting surface of the base member, wherein
   in the first surface, at least a part of a portion opposed to the reflecting surface and the air layer is set as an incident area of the excitation light.

2. The wavelength conversion element according to claim 1, wherein
   the wavelength conversion section further has a third surface crossing one of the first surface and the second surface,
   the holding section has an adhesive configured to bond the third surface of the wavelength conversion section and the base member to each other,
   the base member has the first recessed part and a third recessed part which is at least partially opposed to the second surface of the wavelength conversion section, and is disposed separately from the first recessed part,
   a part of the adhesive is housed in the third recessed part,
   the first recessed part has a first groove part and a second groove part, and
   the second groove part is disposed between the first groove part and the third recessed part, and has a depth deeper than a depth of the first groove part.

3. The wavelength conversion element according to claim 2, wherein
   the second surface of the wavelength conversion section and a surface located between the third recessed part and the second groove part of the base member have contact with each other.

4. The wavelength conversion element according to claim 1, further comprising:
a communication hole configured to communicate the space and an external space with each other.

5. The wavelength conversion element according to claim 1, wherein
the wavelength conversion section has a wavelength conversion layer, and a dielectric multilayer disposed on a surface opposed to the reflecting surface of the wavelength conversion layer.

6. An illumination device comprising:
the wavelength conversion element according to claim 1; and
a light source configured to emit the excitation light toward the wavelength conversion element.

7. An illumination device comprising:
the wavelength conversion element according to claim 2; and
a light source configured to emit the excitation light toward the wavelength conversion element.

8. An illumination device comprising:
the wavelength conversion element according to claim 3; and
a light source configured to emit the excitation light toward the wavelength conversion element.

9. An illumination device comprising:
the wavelength conversion element according to claim 4; and
a light source configured to emit the excitation light toward the wavelength conversion element.

10. An illumination device comprising:
the wavelength conversion element according to claim 5; and
a light source configured to emit the excitation light toward the wavelength conversion element.

11. The illumination device according to claim 6, further comprising:
a rotary device, wherein
the wavelength conversion element is made rotatable around a rotary shaft, and
the rotary device rotates the wavelength conversion element around the rotary shaft.

12. A projector comprising:
the illumination device according to claim 6;
a light modulation device configured to modulate the light from the illumination device in accordance with image information; and
a projection optical device configured to project the light modulated by the light modulation device.

13. A projector comprising:
the illumination device according to claim 7;
a light modulation device configured to modulate the light from the illumination device in accordance with image information; and
a projection optical device configured to project the light modulated by the light modulation device.

14. A projector comprising:
the illumination device according to claim 8;
a light modulation device configured to modulate the light from the illumination device in accordance with image information; and
a projection optical device configured to project the light modulated by the light modulation device.

15. A projector comprising:
the illumination device according to claim 9;
a light modulation device configured to modulate the light from the illumination device in accordance with image information; and
a projection optical device configured to project the light modulated by the light modulation device.

16. A projector comprising:
the illumination device according to claim 10;
a light modulation device configured to modulate the light from the illumination device in accordance with image information; and
a projection optical device configured to project the light modulated by the light modulation device.

17. A projector comprising:
the illumination device according to claim 11;
a light modulation device configured to modulate the light from the illumination device in accordance with image information; and
a projection optical device configured to project the light modulated by the light modulation device.

* * * * *